United States Patent [19]

Hongo et al.

[11] Patent Number: 4,888,388
[45] Date of Patent: Dec. 19, 1989

[54] POLYCARBONATE RESIN COMPOSITION

[75] Inventors: Masafumi Hongo, Hatsukaichi; Hideyuki Shigemitsu, Otake; Naoki Yamamoto, Hiroshima; Akira Yanagase, Otake, all of Japan

[73] Assignee: Mitsubishi Rayon Company Limited, Tokyo, Japan

[21] Appl. No.: 246,612

[22] Filed: Sep. 20, 1988

[30] Foreign Application Priority Data

Sep. 21, 1987 [JP] Japan .................... 62-236829
Mar. 10, 1988 [JP] Japan .................... 63-57041

[51] Int. Cl.$^4$ ............................. C08L 69/00
[52] U.S. Cl. ........................... 525/67; 525/148
[58] Field of Search .............. 525/67, 446, 464, 148, 525/439, 903

[56] References Cited

FOREIGN PATENT DOCUMENTS 0249964 12/1987 European Pat. Off. .

Primary Examiner—Theodore E. Pertilla
Attorney, Agent, or Firm—Cushman, Darby & Cushman

[57] ABSTRACT

A polycarbonate resin composition comprising a polycarbonate resin (A) or a mixture (A') of a polycarbonate resin with a saturated polyester resin and/or a polyester elastomer, and a compound rubber type graft copolymer (B) having at least one vinyl monomer graft-polymerized onto a compound rubber composed of from 10 to 90% by weight of a polyorganosiloxane rubber and from 10 to 90% by weight of a polyalkyl (meth)acrylate rubber in a total amount of 100% by weight in an inseparable interlocking fashion and having an average particle size of from 0.08 to 0.6 μm, or a mixture (B') of such a compound rubber type graft copolymer (B) with a vinyl monomer, wherein component (B) or (B') is in an amount such that the compound rubber is from 0.5 to 60% by weight based on the entire resin composition.

9 Claims, 2 Drawing Sheets

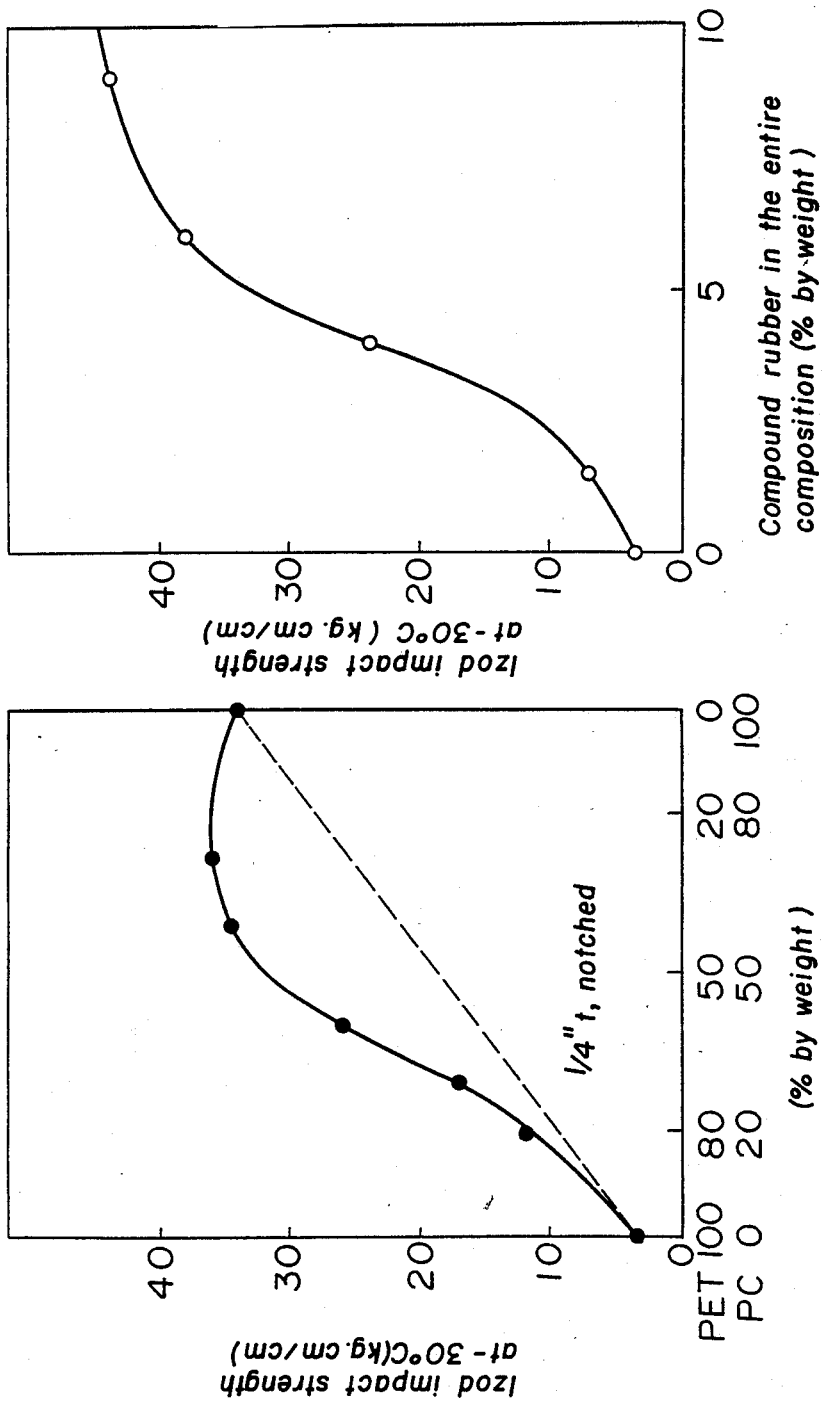

POLYCARBONATE RESIN COMPOSITION

The present invention relates to a polycarbonate resin composition having chemical resistance, weather resistance, heat resistance and impact resistance.

A polycarbonate resin is widely used as a thermoplastic resin having excellent heat resistance and impact resistance. However, the polycarbonate resin has been restricted in its use, since the impact resistance at a temperature of not higher than 0° C. is poor due to the polymer structure, and there is a substantial difference in the impact resistance depending upon the wall thickness of the molded product. Various methods have been proposed to overcome such drawbacks. For example, Japanese Examined Patent Publication Nos. 15225/1963, 27579/1980, 21530/1982, 12300/1983 and 46269/1983 and Japanese Unexamined Patent Publications Nos. 40536/1982, 149938/1983 and 12047/1982, diclose methods where in an ABS resin is blended to the polycarbonate resin. Further, Japanese Examined Patent Publication No. 29308/1973 discloses that a resin composition comprising a polycarbonate resin and a resin polymer including an acrylate copolymer, is excellent in the weather resistance and craze resistance.

Further, various methods have been proposed for the improvement of the mechanical properties and thermal properties of an aromatic polycarbonate resin and an aromatic polyester resin. A combination of the two resins does not provide adequate impact resistance, and for its improvement, a resin composition has been proposed which comprises an aromatic polyester resin, an aromatic polycarbonate resin and a butadiene type graft copolymer, for instance, in Japanese Examined Patent Publication No. 9435/1980. Such a resin composition is successful to some extent in the improvement of the impact resistance, but it has an inherent drawback that the weather resistance is poor. Further, Japanese Unexamined Patent Publication No. 129246/1978 discloses that a molded product having excellent weather resistance and impact resistance can be prepared by blending an acrylate copolymer to the aromatic polycarbonate resin and the aromatic polyester resin, but it has a drawback that the impact resistance at a low temperature is poor.

As described above, various proposals have been made for the modifications of an aromatic polycarbonate resin or a mixture of a polycarbonate resin and a polyester resin. However, the one wherein the impact resistance has been improved is inferior in the weather resistance, and the one having adequate weather resistance tends to be inadequate in the impact resistance. Thus, there has been no proposal which improves the entire physical properties in a balanced fashion.

The present inventors have earlier proposed to incorporate a copolymer of a polyorganosiloxane rubber graft-polymerized with a vinyl monomer to a polycarbonate resin or to a mixture of a polycarbonate resin and a saturated polyester resin to obtain a composition which satisfies the impact resistance and weather resistance in Japanese Patent Applications No. 140636/1986 and No. 165537/1986. By such a composition, the impact resistance and the weather resistance can be improved, but the molded product is inferior in the surface appearance and irregular reflection such as pearl gloss is likely to take place, and it has a problem in the colorability with a dyestuff or pigment such that even when carbon black is added, a black color can not be obtained. Further, it has a problem in the heat stability such that when exposed at a high temperature, the molded product has poor dimensional stability. On the other hand, there has been a substantial expectation for organic materials in the automotive, electronic and electrical fields, and organic materials having high levels of various functions are desired. In particular, in the field where metals have been most commonly used as in the field of exterior materials for automobiles, resins capable of providing a good surface appearance and higher impact resistance, weather resistance and heat resistance, are desired. However, no adequate improvement has been made, and use of resins in the field where high levels of physical properties are required under severe environmental conditions has been limited.

The present inventors have conducted extensive researches to obtain a highly impact resistant material which is excellent also in the surface appearance, colorability, heat resistance and low-temperature impact resistance. As a result, they have unexpectedly found that when a graft copolymer based on a novel compound rubber composed of a polyorganosiloxane rubber and an alkyl (meth)acrylate rubber is blended to a polycarbonate resin or to a mixture of a polycarbonate resin and a saturated polyester resin and/or a polyester elastomer, the low-temperature impact resistance and the thermal stability can be improved over the case where a graft polymer based on the polyorganosiloxane rubber alone is blended, and it is thereby possible to obtain a molded product colorable with a dyestuff or pigment to provide an excellent surface appearance without irregular reflection such as pearl gloss. The present invention has been accomplished on the basis of this discovery.

The present invention provides a polycarbonate resin composition comprising a polycarbonate resin (A) or a mixture (A') of a polycarbonate resin with a saturated polyester resin and/or a polyester elastomer, and a compound rubber type graft copolymer (B) having at least one vinyl monomer graft-polymerized onto a compound rubber composed of from 10 to 90% by weight of a polyorganosiloxane rubber and from 10 to 90% by weight of a polyalkyl (meth)acrylate rubber in a total amount of 100% by weight in an inseparable interlocking fashion and having an average particle size of from 0.08 to 0.6 μm, or a mixture (B') of such a compound rubber type graft copolymer (B) with a vinyl polymer, wherein component (B) or (B') is in an amount such that the compound rubber is from 0.5 to 60% by weight based on the entire resin composition.

With the composition of the present invention, it is possible to obtain a molded product which not only has excellent weather resistance but also has the colorability with a colorant substantially improved to provide excellent surface appearance and gloss. As another feature of the present invention, it is important that when a graft copolymer based on the compound rubber of the present invention is blended, the low-temperature impact resistance is superior over the case where a graft copolymer based solely on the polyorganosiloxane rubber which used to be considered most excellent in the low-temperature impact resistance is used. The alkyl (meth)acrylate rubber has a glass transition temperature (Tg) which is substantially higher than the glass transition temperature of the polyorganosiloxane rubber, and thus it is natural to consider that when these materials are compounded, the low-temperature impact resistance would be lower than the case where the polyorganosiloxane rubber is used alone as the base.

Now, the present invention will be described in detail with reference to the preferred embodiments.

In the accompanying drawings:

FIG. 3 shows the change in the impact strength when the ratio of the polyester and the polycarbonate is varied in the composition of a graft copolymer/(polyester+polycarbonate) with a weight ratio of 15/85.

FIG. 4 shows the effects of the compound rubber in the compound rubber type graft copolymer.

Figure 2:
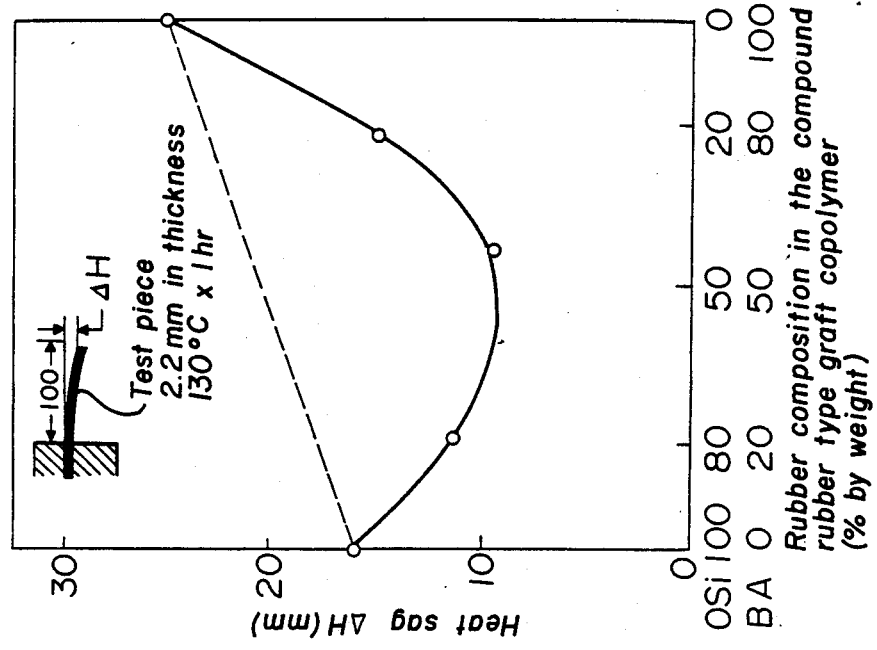
FIGS. 1 and 2 show the effects of the rubber composition in the compound rubber type graft copolymer in the composition of a polycarbonate/polytetramethylene terephthalate/graft copolymer with a weight ratio of 30/50/15, as represented by the impact strength and the heat sag, respectively.

The polycarbonate resin (A) to be used in the present invention, is a polycarbonate produced by using a dihydroxydiphenylalkane as the main starting material. More specifically, it is preferably a polycarbonate obtained by an ester interchange method or a phosgene method using 2,2-(4,4'-dihydroxydiphenyl)propane i.e. bisphenol A as the dihydroxy component. A part or whole of the above bisphenol A may be substituted by other 4,4'-dihydroxydiphenylalkane or by 4,4'-dihydroxydiphenylsulfone or 4,4'-dihydroxydiphenyl ether. Further, two or more may be used in combination as a mixture.

When a mixture (A') of a polycarbonate resin and a saturated polyester resin and/or a polyester elastomer is used, the saturated polyester resin is a resin obtained by a condensation reaction using an aromatic dicarboxylic acid or its ester-forming derivative and an alkylene glycol as the main components. For example, such a resin may be obtained by reacting a dicarboxylic acid such as terephthalic acid, isophthalic acid or naphthalenedicarboxylic acid with a glycol such as ethylene glycol, propylene glycol, tetramethylene glycol or hexamethylene glycol. If necessary, other dicarboxylic acids or glycols may be copolymerized in small amounts. Preferred saturated polyester resins include polytetramethylene terephthalate, polyethylene terephthalate and a mixture thereof.

The polyester elastomer to be used in the present invention is a block copolymer comprising a high melting point polyester segment and a low melting point polymer segment having a molecular weight of from 400 to 20,000. Here, the high melting point polyester segment is a polyester obtained by a condensation reaction of an aromatic dicarboxylic acid with an alkylene glycol. Specific examples are the same as in the case of the above-mentioned saturated polyester. On the other hand, the low melting polymer segment includes a polyalkylene ether glycol such as poly(ethyleneoxide) glycol, poly(tetramethyleneoxide) glycol and poly(propyleneoxide) glycol and a mixture thereof, and an aliphatic polyester, for example, a polyester obtained from an aliphatic dicarboxylic acid having from 2 to 12 carbon atoms and an aliphatic glycol having from 2 to 10 carbon atoms, more specifically, polyethylene adipate, polytetramethylene adipate, polyethylene sebacate, polyneopentyl sebacate, polyhexamethylene azelate and poly-ε-caprolactone. The proportion of such a low melting point polymer segment in the polyester elastomer is preferably from 2 to 80% by weight.

The compound rubber type graft copolymer (B) to be used in the present invention is a copolymer having at least one vinyl monomer graft-polymerized onto a compound rubber composed of from 10 to 90% by weight of a polyorganosiloxane rubber and from 10 to 90% by weight of a polyalkyl (meth)acrylate rubber in a total amount of 100% by weight in an inseparably interlocking fashion and having an average particle size of from 0.08 to 0.6 μm.

It is impossible to obtain the desired properties of the resin composition of the present invention even if either the polyorganosiloxane rubber or the polyalkyl (meth)acrylate rubber, or a simple mixture of the two rubber components is used as the rubber source instead of the above-mentioned compound rubber. When the polyorganosiloxane rubber and the polyalkyl (meth)acrylate rubber are interlocked to form a unitary composite, it is for the first time possible to obtain a resin composition which is capable of providing a molded product having excellent impact resistance and colorability with a dyestuff or pigment.

If the polyorganosiloxane rubber constituting the compound rubber exceeds 90% by weight, the surface appearance of a molded product of the resin composition thereby obtained tends to be poor and the colorability will be poor. Whereas, if the polyalkyl (meth)acrylate rubber exceeds 90% by weight, the impact resistance of a molded product of the resin composition thereby obtained tends to be poor. Therefore, each of the two rubber components constituting the compound rubber is required to be within a range of from 10 to 90% by weight (provided that the total amount of the two rubber components is 100% by weight). It is particularly preferred that each of them is within a range of from 20 to 80% by weight. The average particle size of the compound rubber is required to be within a range of from 0.08 to 0.6 μm. If the average particle size is less than 0.08 μm, the impact resistance of a molded product of the resin composition thereby obtained, tends to be poor. On the other hand, if the average particle size exceeds 0.6 μm, the surface appearance of a molded product from the resin composition thereby obtained, tends to be poor. Emulsion polymerization is most suitable to obtain the compound rubber having such an average particle size. It is preferred that firstly a latex of the polyorganosiloxane rubber is prepared, and then the rubber particles of the polyorganosiloxane rubber latex are impregnated with a monomer for the synthesis of the alkyl (meth)acrylate rubber, followed by the polymerization of the monomer.

The polyorganosiloxane rubber constituting the above compound rubber may be prepared by emulsion polymerization using an organosiloxane and a crosslinking agent (I) as described hereinafter. At that time, a grafting agent (I) may further be used.

The organosiloxane may be various types of cyclic siloxanes of at least three-membered ring, preferably from 3- to 6-membered cyclosiloxanes. For example, hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane and octaphenylcyclotetrasiloxane. These siloxanes may be used alone or in combination as a mixture of two or more different types. The organosiloxane is used in an amount of at least 50% by weight, preferably at least 70% by weight, in the polyorganosiloxane rubber.

The crosslinking agent (I) may be a trifunctional or tetrafunctional silane type crosslinking agent, such as trimethoxymethylsilane, triethoxyphenylsilane, tetramethoxysilane, tetraethoxysilane, tetra-n-propoxysilane or tetrabutoxysilane. Tetrafunctional crosslinking agents are particularly preferred, and among them, tetraethoxysilane is especially preferred. The crosslinking agent is used usually in an amount of from 0.1 to 30% by weight in the polyorganosiloxane rubber.

The grafting agent (I) may be a compound capable of forming a unit represented by the formula:

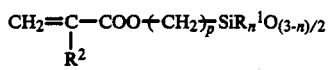  (I-1)

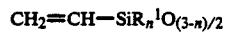  (I-2)

or

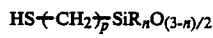  (I-3)

wherein $R^1$ is a methyl group, an ethyl group, a propyl group or a phenyl group, $R^2$ is a hydrogen atom or a methyl group, n is 0, 1 or 2, and p is a number of from 1 to 6.

A (meth)acryloyloxysiloxane capable of forming the unit of the formula (I-1) has a high graft efficiency and thus is capable of forming effective graft chains, and it is advantageous from the viewpoint of providing impact resistance. A methacryloyloxysiloxane is particularly preferred as the compound capable of forming the unit of the formula (I-1). Specific examples of the methacryloyloxysiloxane include β-methacryloyloxyethyldimethoxymethylsilane, γ-methacryloyloxypropylmethoxydimethylsilane, γ-methacryloyloxypropyldimethoxymethylsilane, γ-methacryloyloxypropyltrimethoxysilane, γ-methacryloyloxypropylethoxydiethylsilane, γ-methacryloyloxypropyldiethoxymethylsilane and δ-methacryloyloxybutyldiethoxymethylsilane. The grafting agent is used usually in an amount of from 0 to 10% by weight in the polyorganosiloxane rubber.

The latex of this polyorganosiloxane rubber may be prepared by a process disclosed, for example, in U.S. Pat. Nos. 2,891,920 or 3,294,725. In the present invention, such a latex is preferably prepared in such a manner that a solution mixture of the organosiloxane, the crosslinking agent (I) and optionally the grafting agent (I) is subjected to shear-mixing with water by means of e.g. a homogenizer in the presence of a sulfonic acid type emulsifier such as an alkylbenzenesulfonic acid or an alkylsulfonic acid. The alkylbenzenesulfonic acid is preferred since it serves not only as an emulsifier for the organosiloxane but also as a polymerization initiator. Further, it is preferred to combine a metal salt of an alkylbenzenesulfonic acid or a metal salt of an alkylsulfonic acid, since such combined use is effective for maintaining the polymer under a stabilized condition during the graft polymerization.

Next, the polyalkyl (meth)acrylate rubber constituting the compound rubber may be prepared by using an alkyl (meth)acrylate, a crosslinking agent (II) and a grafting agent (II) as described hereinafter.

The alkyl (meth)acrylate may be an acryl acrylate such as methyl acrylate, ethyl acrylate, n-propyl acrylate, n-butyl acrylate or 2-ethylhexyl acrylate, or an alkyl methacrylate such as hexyl methacrylate, 2-ethylhexyl methacrylate or n-lauryl methacrylate. It is particularly preferred to use n-butyl acrylate.

The crosslinking agent (II) may be, for example, ethylene glycol dimethacrylate, propylene glycol dimethacrylate, 1,3-butylene glycol dimethacrylate or 1,4-butylene glycol dimethacrylate.

The grafting agent (II) may be, for example, allyl methacrylate, triallyl cyanurate or triallyl isocyanurate. Allyl methacrylate can be used also as a crosslinking agent.

These crosslinking agents and grafting agents may be used alone or in combination as a mixture of two or more different types. The total amount of such crosslinking agent and grafting agent is from 0.1 to 20% by weight in the polyalkyl (meth)acrylate rubber.

The polymerization of the polyalkyl (meth)acrylate rubber is conducted by adding the above-mentioned alkyl (meth)acrylate, the crosslinking agent and the grafting agent into the latex of the polyorganosiloxane rubber neutralized by an addition of an aqueous solution of an alkali such as sodium hydroxide, potassium hydroxide or sodium carbonate to have them impregnated into the polyorganosiloxane rubber particles, followed by an addition of a usual radical polymerization initiator. As the polymerization progresses, a cross-linked network of a polyalkyl (meth)acrylate rubber interlocked with the cross-linked network of the polyorganosiloxane rubber will be formed to obtain a latex of a compound rubber wherein the polyorganosiloxane rubber and the polyalkyl (meth)acrylate rubber are interlocked in an inseparable manner. In the present invention, as the compound rubber, it is preferred to use a compound rubber wherein the backbone of the polyorganosiloxane rubber has repeating units of dimethylsiloxane and the backbone of the polyalkyl (meth)acrylate rubber has repeating units of n-butyl acrylate.

The compound rubber thus prepared by emulsion polymerization, is graft-copolymerizable with a vinyl monomer. Further, the polyorganosiloxane rubber and the polyalkyl (meth)acrylate rubber are firmly interlocked, so that they can not be separated by extraction with a usual organic solvent such as acetone or toluene. The gel content of the compound rubber measured by extraction with toluene at 90° C. for 12 hours is at least 80% by weight.

The vinyl monomer to be graft-polymerized onto this compound rubber, may be various vinyl monomers including an alkenyl aromatic compound such as styrene, α-methylstyrene or vinyltoluene; a methacrylic acid ester such as methyl methacrylate or 2-ethylhexyl methacrylate; an acrylic acid ester such as methyl acrylate, ethyl acrylate or butyl acrylate; and a vinyl cyanide compound such as acrylonitrile or methacrylonitrile. These vinyl monomers may be used alone or in combination as a mixture of two or more different kinds.

The proportions of the compound rubber and the vinyl monomer in the compound rubber type graft copolymer (B) are preferably such that the compound rubber is from 30 to 95% by weight, preferably from 40 to 90% by weight and the vinyl monomer is from 5 to 70% by weight, preferably from 10 to 60% by weight, based on the weight of the graft copolymer (B). If the vinyl monomer is less than 5% by weight, the dispersion of the graft copolymer (B) in the resin composition tends to be inadequate. On the other hand, if it exceeds 70% by weight, the effect for the improvement of the impact strength tends to be low, such being undesirable.

The compound rubber type graft copolymer (B) can be separated and recovered in such a manner that a compound rubber type graft copolymer latex obtained by adding the above-mentioned vinyl monomer to a latex of the compound rubber, followed by polymerization in a single step or in multi steps by a radical polymerization technique, is poured into hot water in which a metal salt such as calcium chloride or magnesium sulfate is dissolved, followed by salting out and coagulation.

When a mixture (B') of such a compound rubber type graft copolymer with a vinyl polymer is used in the composition of the present invention, the vinyl polymer is preferably the one obtained by polymerizing from 70 to 100% by weight of at least one monomer selected from the group consisting of an aromatic vinyl monomer, a vinyl cyanide monomer and a (meth)acrylate monomer and from 0 to 30% by weight of a vinyl monomer copolymerizable therewith. For example, it may be a polymer or copolymer of at least one monomer selected from the group consisting of styrene, α-methylstyrene, methyl methacrylate, ethyl acrylate, methyl acrylate, butyl acrylate, acrylonitrile and methacrylonitrile, or a copolymer obtained by copolymerizing such a monomer with not more than 30% by weight of other vinyl monomer such as n-phenylmaleimide, ethylene or vinyl acetate. These vinyl polymers may be used in combination as a mixture of two or more different types. The vinyl polymer is preferably prepared by emulsion polymerization, whereby various monomers can readily be grafted.

The proportions of the respective components constituting the resin composition of the present invention are such that the compound rubber type graft copolymer (B) or the mixture (B') of the compound rubber type graft copolymer with the vinyl polymer is incorporated in such an amount that the compound rubber will be from 0.5 to 60% by weight based on the weight of the entire composition. If the amount of the compound rubber in component (B) or (B') is less than 0.5% by weight based on the weight of the entire resin composition, the effect of the present invention for modification, particularly the effect for the improvement of the impact resistance and chemical resistance, tends to be inadequate. On the other hand, if the amount exceeds 60% by weight, the moldability tends to be poor, such being undesirable.

When the composition is composed of the polycarbonate resin (A) and the compound rubber type graft copolymer (B) or the mixture (B') of the copolymer (B) with the vinyl polymer, it is preferably composed of from 10 to 90% by weight of component (A) and from 10 to 90% by weight of component (B) and (B'), in view of the chemical resistance and the impact resistance.

Particularly, when the content of the compound rubber constituting the copolymer (B) is large, it is effective to incorporate the vinyl polymer as in the case of component (B') for the improvement of the moldability. The vinyl polymer may preferably be incorporated in an amount within a range of from 0 to 85% by weight, based on the weight of the entire resin composition.

When the composition is composed of component (A') and component (B) or (B'), it is preferably composed of from 1 to 99 parts by weight of the polycarbonate resin and from 1 to 99 parts by weight of the saturated polyester resin and/or the polyester elastomer. If the proportion of component (B) or (B') is less than 1 part by weight, no adequate effect for the incorporation will be obtained.

There is no particular restriction as to the manner for the preparation of the polycarbonate resin composition of the present invention. It may be prepared by various conventional methods including a method wherein powder or particulate materials are mixed by e.g. a Henschel mixer or tumbler, and the mixture is melt-kneaded by an extruder, a kneader or a mixer, a method wherein to a preliminarily molten component, other components are sequentially mixed, or a method wherein a mixture is directly molded by an injection molding machine.

Further, to the thermoplastic resin composition of the present invention, a heat or light stabilizer such as a phenol type or phosphate type stabilizer, a ultraviolet absorber or an amine type photostabilizer; a modifier to provide resistance against e.g. hydrolysis such as an epoxy type modifier; a conventional flame retardant; a filler such as glass fibers, titanium oxide or talc; a dyestuff or pigment; a plasticizer, etc. may be added as the case requires.

Now, the present invention will be described in further detail with reference to Examples. However, it should be understood that the present invention is by no means restricted by such specific Examples. In the following description, "parts" and "%" mean "parts by weight" and "% by weight", respectively.

REFERENCE EXAMPLE

Preparation of Compound Rubber Type Graft Copolymer S-1 to S-3

Two parts of tetraethoxysilane, 0.5 part of γ-methacryloyloxypropyldimethoxymethylsilane and 97.5 parts of octamethylcyclotetrasiloxane were mixed to obtain 100 parts of a siloxane mixture. Then, 100 parts of the siloxane mixture was added to 200 parts of distilled water having 1 part of sodium dodecylbenzene sulfonate and 1 part of dodecylbenzene sulfonic acid dissolved therein. The mixture was preliminarily stirred at 10,000 rpm by a homomixer and then emulsified and dispersed under a pressure of 300 kg/cm$^2$ by a homogenizer to obtain an organosiloxane latex. This mixture was transferred to a separable flask equipped with a condenser and a stirrer, and it was heated at 80° C. for 5 hours under stirring and mixing and then left at 20° C. for 48 hours. Then, this latex was neutralized to pH 6.9 with an aqueous sodium hydroxide solution, and the polymerization was completed to obtain a polyorganosiloxane rubber latex 1. The degree of polymerization of the polyorganosiloxane rubber thus obtained was 89.7%, and the average particle size of the polyorganosiloxane rubber was 0.16 μm.

Then, 100 parts (solid content: 30%) of the polyorganosiloxane rubber latex 1 was introduced into a separable flask equipped with a stirrer, and 120 parts of distilled water was added thereto. After flushing with nitrogen, the mixture was heated to 50° C., and a mixed solution comprising 37.5 parts of n-butyl acrylate, 2.5 parts of allyl methacrylate and 0.3 part of tert-butyl hydroperoxide, was charged, and the mixture was stirred for 30 minutes to impregnate the mixed solution into the polyorganosiloxane rubber particles. Then, a mixed solution comprising 0.0003 part of ferrous sulfate, 0.001 part of disodium ethylenediamine tetraacetate, 0.17 part of Rongalite and 3 parts of distilled water, was charged thereto to initiate radical polymerization, and the internal temperature was maintained at 70° C. for 2 hours to complete the polymerization to obtain a compound rubber latex. A part of this latex was sampled, and the average particle size of the compound rubber was measured and found to be 0.19 μm. This latex was dried to obtain a solid product, which was extracted with toluene at 90° C. for 12 hours, whereby the gel content was measured and found to be 90.3% by weight. To this compound rubber latex, a mixed solution comprising 0.3 part of tert-butyl hydroperoxide, 9 parts of acrylonitrile and 21 parts of styrene, was dropwise added over a period of 45 minutes at 70° C., and the mixture was maintained at 70° C. for 4 hours to complete the graft polymerization to the compound rubber.

The degree of polymerization of the graft copolymer thereby obtained was 98.6%. The graft copolymer latex thus obtained was dropwise added to hot water containing 5% by weight of calcium chloride and coagulated, and the coagulated product was separated, washed and dried at 75° C. for 16 hours to obtain a compound rubber type graft copolymer S-2.

Compound rubber type graft copolymers S-1 and S-3 were prepared in the same manner except that the proportions of the polyorganosiloxane rubber and the butyl acrylate rubber were changed as shown in Table 1. In the following Tables, $OS_1$ means the polyorganosiloxane rubber, BA means the butyl acrylate rubber, AN means acrylonitrile, and ST means styrene.

TABLE 1

| Graft co-polymer | Rubber components $OS_1$ | Rubber components BA | Amount of compound rubber | Weight ratio of AN/ST | Amount of AN/ST |
|---|---|---|---|---|---|
| S-1 | 55 | 15 | 70 | 30/70 | 30 |
| S-2 | 30 | 40 | 70 | 30/70 | 30 |
| S-3 | 15 | 55 | 70 | 30/70 | 30 |

COMPARATIVE REFERENCE EXAMPLE

Preparation of an Organosiloxane Graft Copolymer C-1 and an Acrylate Graft Copolymer C-2

233 Parts of the above-mentioned polyorganosiloxane rubber latex 1 was charged into a separable flask equipped with a stirrer, heated to 70° and stirred. Then, a mixed solution comprising 0.0003 part of ferrous sulfate, 0.001 part of disodium ethylenediamine tetraacetate, 0.17 part of Rongalite and 3 parts of distilled water, was charged thereto, and a mixed solution comprising 0.3 part of tert-butyl hydroperoxide, 9 parts of acrylonitrile and 21 parts of styrene, was dropwise added thereto over a period of 45 minutes. Then, the mixture was maintained at 70° C. for 4 hours to complete the graft polymerization.

The degree of polymerization of the copolymer thereby obtained was 97.5%. This latex was dropwise added to hot water containing 5% by weight of calcium chloride and coagulated, and the coagulated product was separated, washed and dried at 75° C. for 16 hours to obtain an organosiloxane graft copolymer C-1.

For the preparation of an acrylate graft copolymer, a mixed solution comprising 67.5 parts of n-butyl acrylate, 2.5 parts of allyl methacrylate and 0.3 part of tert-butyl hydroperoxide was emulsified in 200 parts of distilled water having 2 parts of sodium dodecylbenzene sulfonate dissolved therein. After flushing with nitrogen, the mixture was heated to 50° C., and the polymerization was initiated by an addition of a redox type radical initiator. After completion of the polymerization of butyl acrylate, a mixed solution comprising 9 parts of acrylonitrile, 21 parts of styrene and 0.3 part of tert-butyl hydroperoxide, was dropwise added at 70° C. for graft copolymerization. After completion of the polymerization, coagulation, washing and drying were conducted to obtain a graft copolymer C-2.

EXAMPLE 1 and COMPARATIVE EXAMPLE 1 and 2

A polycarbonate resin (7022PJ, tradename, manufactured by Mitsubishi Kasei Corporation) and the compound rubber type graft copolymer S-2 prepared in Reference Example 1 were weighed in the proportions as identified in Table 2 and mixed for 4 minutes in a Henschel mixer, and the mixture was pelletized by a 30 mm$\phi$ twin-screw extruder at a cylinder temperature of 260° C. The pellets thereby obtained were dried and injection-molded by a 5 ounce injection-molded machine at a cylinder temperature of 260° C. and a mold temperature of 60° C. to obtain test pieces for measuring various physical properties. The evaluation was conducted. The results are shown in Table 2.

Comparative Examples 1 and 2 were conducted in the same manner as in Example 1 except that instead of the compound rubber type graft copolymer S-2, the organosiloxane type graft copolymer C-1 and the acrylate type graft copolymer C-2 obtained in Comparative Reference Example were used.

It is evident from Table 2 that from the resin composition wherein the compound rubber type graft copolymer of the present invention is used, it is possible to obtain a molded product having impact resistance, particularly excellent low-temperature impact resistance, and having also excellent surface appearance and gloss.

Whereas, the products obtained from the compositions wherein the graft copolymers of Comparative Examples, are inferior in the gloss or in the low-temperature impact resistance.

TABLE 2

| | | | Example 1 | Comparative Example 1 | Comparative Example 2 |
|---|---|---|---|---|---|
| Composition | A | Polycarbonate resin (parts) | 80 | 80 | 80 |
| | B | Graft Type | S-2 | C-1 | C-2 |
| | | copolymer Amount (parts) | 20 | 20 | 20 |
| Izod impact strenth[1] (notched) (kg.cm/cm) | | 23° C. | 66 | 63 | 64 |
| | | −30° C. | 51 | 40 | 9 |
| Surface appearance | | Visual evaluation | O | ×[4] | O |
| | | Gloss[2] | 96.0 | 28.5 | 94.7 |
| Heat distortion temp.[3] | | | | | |

TABLE 2-continued

|  | Example 1 | Comparative Example 1 | Comparative Example 2 |
|---|---|---|---|
| (18.56 kg/cm$^2$) (°C.) | 137 | 136 | 137 |

[1] Measured by ASTM D256.
[2] A plate of 100 × 100 × 3 mm$^t$ was measured by a gloss meter (manufactured by Murakami Color Research Laboratory).
[3] Measured by ASTM D648.
[4] Flow mark was observed.

EXAMPLES 2 to 5 and COMPARATIVE EXAMPLES 3 and 4

The same polycarbonate resin as used in Example 1 and the compound rubber type graft copolymer S-2 and the vinyl copolymer as identified in Table 3 were weighed in the proportions as identified in Table 3 and treated in the same manner as in Example 1 to obtain resin compositions of the present invention. These compositions were injection-molded and evaluated in the same manner as in Example 1. The results are also shown in Table 3.

The resin compositions of the Comparative Examples are composed of the same constituting components as the resin composition of the present invention, but the proportions of the components are different from the present invention.

The molded products obtained by the resin compositions of the present invention had excellent gloss and surface appearance without sink marks or warpage.

Figure 1:
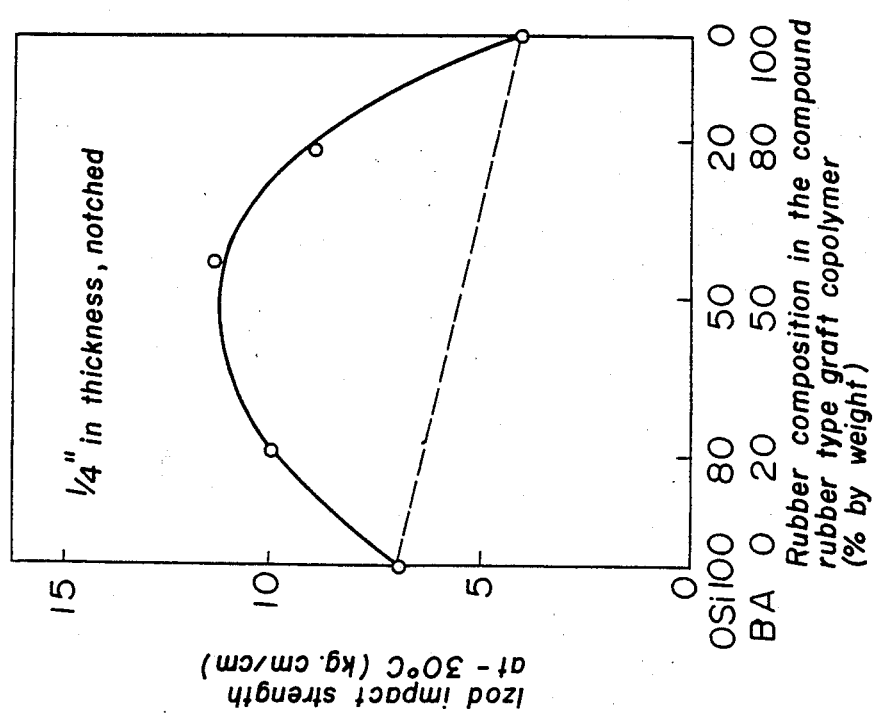

Corporation) was added to each composition and melt-kneaded. Evaluation was conducted by using these compositions. The results are shown in FIGS. 1 and 2 and Table 4. In the Table and the Figures, the Izod impact strength was measured by ASTM D256, the melt index was measured by ASTM D1238, and the Rockwell hardness was measured by ASTM D785. The heat sag was determined in such a manner that a test piece having a width of 12.7 mm, a length of 127 mm and a thickness of 2.2 mm was heated at 130° C. for one hour with an overhang of 100 mm, whereupon the deflection (ΔH) was obtained. The black colorability was visually evaluated.

It is evident from Table 4 and FIGS. 1 and 2 that the compositions of the present invention provide molded products having remarkably improved impact resistance and excellent heat stability shown by the heat sag and undergo no substantial deformation, by using the novel compound rubber type graft copolymers, and yet it is thereby possible to obtain molded products having

TABLE 3

|  |  |  | Comparative Example 3 | Example 2 | Example 3 | Example 4 | Example 5 | Comparative Example 4 |
|---|---|---|---|---|---|---|---|---|
| Composition | A | Polycarbonte resin (parts) | 5 | 20 | 40 | 60 | 80 | 95 |
|  |  | Compound rubber type graft copolymer (parts) | 30 | 30 | 30 | 20 | 10 | 1 |
|  | B' | Vinyl copolymer | | | | | | |
|  |  | Copolymer of AN/ST = 25/75 by weight | 65 | 50 | — | — | 10 | 4 |
|  |  | Copolymer of MMA/ST*1 = 60/40 by weight | — | — | — | 20 | — | — |
|  |  | Copolymer of AN/α-MST*2/PM*3 = 20/65/15 by weight | — | — | 30 | — | — | — |
| Izod impact strength (notched) (kg.cm/cm) | 23° C. | | 27 | 35 | 45 | 55 | 70 | 7 |
|  | −30° C. | | 17 | 25 | 31 | 40 | 44 | 5 |
| Heat distortion temp. (18.56 kg/cm$^2$) (°C.) | | | 84 | 100 | 122 | 129 | 133 | 137 |

*1 MMA: Methyl methacrylate
*2 α-MST: α-Methylstyrene
*3 PM: Phenylmaleimide

EXAMPLES 6 to 8 and COMPARATIVE EXAMPLES 5 and 6

The graft copolymer S-1, S-2, S-3, C-1 and C-2 prepared in Reference Example and Comparative Reference Example, a polytetramethylene terephthalate having an intrinsic viscosity [η] of 1.05 and a bisphenol A type polycarbonate having a viscosity average molecular weight of about 22,000 were, respectively, weighed in the proportions as identified in Table 4 and mixed for 4 minutes in a Henschel mixer. The respective mixtures were melt-kneaded by a 30 mmφ twin-screw extruder at a cylinder temperature of 260° C. and then pelletized to obtain various compositions. For the purpose of comparison of the colorability, 1.0 part of carbon black (MCF88, tradename, manufactured by Mitsubishi Kasei an excellent black color.

TABLE 4

| | Composition | | | | |
|---|---|---|---|---|---|
| | Polycarbonate (parts) | Polytetramethylene terephthalate (parts) | Graft copolymer | | Colorant carbon black (part) |
| | | | Type (parts) | Weight ratio of rubber components OS$_1$/BA | |
| Comparative Example 5 | 35 | 50 | C-1 (15) | 100/0 | 1 |
| Example 6 | " | " | S-1 (15) | 78.6/21.4 | " |
| Example 7 | " | " | S-2 (15) | 42.9/57.1 | " |
| Example 8 | " | " | S-3 | 21.4/78.6 | " |

TABLE 4-continued

| | | | (15) | | |
|---|---|---|---|---|---|
| Comparative Example 6 | " | " | C-2 (15) | 0/100 | " |

| | Izod impact strength (¼" thick, notched) (kg/cm/cm) | | Heat sag (mm) | Melt index (230° C. × 10 kg) (g/10 min.) | Rockwell hardness (R scale) | Black colorability |
|---|---|---|---|---|---|---|
| | 23° C. | −30° C. | | | | |
| Comparative Example 5 | 39.5 | 7.0 | 16 | 5.6 | 110.0 | Poor (Dark pearl gloss) |
| Example 6 | 46.5 | 10.0 | 11.5 | 9.5 | 110.9 | Good |
| Example 7 | 57.5 | 11.4 | 9.5 | 9.3 | 111.4 | Good |
| Example 8 | 65.0 | 9.0 | 15 | 9.9 | 111.5 | Good |
| Comparative Example 6 | 48.0 | 4.1 | 25 | 7.8 | 109.8 | Good |

EXAMPLES 9 to 11 and COMPARATIVE EXAMPLES 7 and 8

In the same manner as in Examples 6 to 8, the graft copolymers S-1, S-2, S-3, C-1 and C-2, a polytetramethylene terephthalate having an intrinsic viscosity [η] of 1.05 and a bisphenol A type polycarbonate having a viscosity average molecular weight of 25,000 were, respectively, weighed in the proportions as identified in Table 5, melt-kneaded and treated in the same manner as in Example 6 to obtain various compositions. These compositions were evaluated, and the results are shown in Table 5. Even when the proportions of the polyester and the polycarbonate were changed, the compound rubber type graft copolymer blend system of the present invention shows excellent low-temperature impact resistance and heat stability.

TABLE 5

| | Composition | | | | |
|---|---|---|---|---|---|
| | Polycarbonate (parts) | Polytetra- methylene tere- phthalate (parts) | Graft copolymer | | |
| | | | Type (parts) | Weight ratio of rubber components | |
| | | | | OS₁ | BA |
| Comparative Example 7 | 53 | 32 | C-1 (15) | 100 | 0 |
| Example 9 | 53 | 32 | S-1 (15) | 78.6 | 21.4 |
| Example 10 | 53 | 32 | S-2 (15) | 42.9 | 57.1 |
| Example 11 | 53 | 32 | S-3 (15) | 21.4 | 78.6 |
| Comparative Example 8 | 53 | 32 | C-2 (15) | 100 | 100 |

| | Izod impact strength (¼" thick, notched) (kg/cm/cm) | | Heat sag (mm) | Rockwell hardness (R scale) | Black colorability |
|---|---|---|---|---|---|
| | 23° C. | −30° C. | | | |
| Comparative Example 7 | 57.0 | 27.5 | 43.5 | 108.5 | Poor (Dark gray pearl gloss) |
| Example 9 | 57.5 | 30.5 | 25.5 | 109.5 | Good |
| Example 10 | 58.0 | 30.5 | 20.0 | 110.6 | Good |
| Example 11 | 68.0 | 25.5 | 57.5 | 110.1 | Good |
| Comparative Example 8 | 72.5 | 5.2 | 74.0 | 107.4 | Good |

EXAMPLES 12 to 21 and COMPARATIVE EXAMPLES 9 and 10

Preparation of Compound Rubber Type Graft Copolymers S-4 and S-5

Polyorganosiloxane latex-2 was prepared in the same manner as in Reference Example except that the emulsification and dispersion for the preparation of the polyorganosiloxane rubber were conducted under a pressure of the homogenizer of 200 kg/cm². The average particle size of this polyorganosiloxane rubber was 0.23 μm.

To this latex, n-butyl acrylate, allyl methacrylate and tert-butyl hydroperoxide were charged and impregnated to the polyorganosiloxane rubber particles, followed by polymerization to obtain a compound rubber latex. The average particle size of the rubber in the compound rubber latex was 0.27 μm. To this compound rubber latex, the graft monomers as identified in Table 6 were dropwise added and polymerized to obtain compound rubber type graft copolymers S-4 and S-5.

TABLE 6

| | Composition of compound rubber | | Graft monomers | | |
|---|---|---|---|---|---|
| | OS₁ | BA | AN | ST | NMA |
| S-4 | 30 | 30 | 12 | 28 | — |
| S-5 | 40 | 40 | — | 6 | 14 |

The compound rubber type graft copolymers S-4 and S-5, a polyethylene terephthalate having an intrinsic viscosity [η] of 1.00, a polytetramethylene terephthalate having an intrinsic viscosity [η] of 0.95 and a bisphenol A type polycarbonate having a viscosity average molecular weight of 25,000 were, respectively, weighed in the proportions as identified in Table 7 and mixed to obtain compositions in the same manner as in Example 1. These compositions were injection-molded in the same manner and evaluated. The results are shown in Table 7 and in FIGS. 3 and 4. To these compositions, 0.2 part of commercially available stabilizers Mark PEP24 (tradename, manufactured by Adeka Argus Chemical Co., Ltd.) and Irganox 1010 (tradename, manufactured by Ciba-Geigy Limited) were incorporated. For the stabilization of the composition, these phosphorus type and phenol type stabilizers as well as thioether type stabilizers may effectively be incorporated, and conventional stabilizers are preferably employed. However, the stabilizer is not limited to such specific examples.

It is evident from Table 7 and FIG. 3 that the system wherein the compound rubber type graft copolymer of the present invention is used, exhibits a high level of low-temperature impact resistance within the wide compositional range of the polycarbonate and the polyester. Further, from FIG. 4, it is evident that good impact resistance can be obtained from a relatively low level of the proportion of the compound rubber in the entire composition. The proportion of the compound rubber is preferably at least 1.5% of the entire composition. The upper limit is determined depending upon the desired properties and the processability. From the viewpoint of the processability, the upper limit is usually 60%.

obtained by the conventional butadiene type graft copolymer, and it has a good surface appearance.

TABLE 7

| | Composition | | | | Izod impact strength at −30° C. (⅛″ thick, notched) (kg.cm/cm) |
|---|---|---|---|---|---|
| | Poly-carbonate (parts) | Thermoplastic polyester | | Compound rubber type graft copolymer | |
| | | Type | Amount (parts) | Type | Amount (parts) | |
| Comparative Example 9 | 0 | *1 PET | 85 | S-5 | 15 | 3.5 |
| Example 12 | 16 | " | 69 | " | " | 11.9 |
| Example 13 | 25 | " | 60 | " | " | 17.0 |
| Example 14 | 35 | " | 50 | " | " | 26.0 |
| Example 15 | 50 | " | 35 | " | " | 34.4 |
| Example 16 | 61 | " | 24 | " | " | 36.1 |
| Example 17 | 85 | " | 0 | " | " | 34.0 |
| Comparative Example 10 | 55 | *2 PTMT | 45 | S-4 | 0 | 3.9 |
| Example 18 | 53.5 | " | 44 | " | 2.5 | 7.4 |
| Example 19 | 51.3 | " | 42 | " | 6.7 | 24.0 |
| Example 20 | 49.5 | " | 40.5 | " | 10 | 38.5 |
| Example 21 | 46.5 | " | 38.5 | " | 15 | 44.0 |

*1 PET: Polyethylene terephthalate
*2 PTMT: Polytetramethylene terephthalate

TABLE 8

| | Composition | | | | Yellowness index after sunshine at 83° C. for 1,000 hours ΔYI | After heat aging at 120° C. for 600 hours | |
|---|---|---|---|---|---|---|---|
| | Polycarbonate (parts) | Polyester Type (parts) | Graft copolymer Type (parts) | Titanium oxide (parts) | | Color difference ΔE | Izod impact strength (kg.cm/cm) |
| Example 22 | 33 | PTMT (42) *3 Elastomer (5) | S-2 (20) | 0.5 | 3 | 2.4 | 72 |
| Comparative Example 11 | 33 | PTMT (42) *3 Elastomer (5) | ABS (20) | 0.5 | 12 | 47.5 | 19 |

*3 Elastomer: Pelprene S2000

EXAMPLE 22 and COMPARATIVE EXAMPLE 11

The compound rubber type graft copolymer S-2, an ABS graft copolymer obtained by graft-polymerizing 30% of a monomer mixture of AN/ST=30/70 to a base of 70% of polybutadiene, instead of the compound rubber, for the purpose of the comparison, bisphenol A type polycarbonate having a viscosity average molecular weight of 22,000, a polytetramethylene terephthalate having an intrinsic viscosity [η] of 1.15 and a commercially available polyester-aliphatic polyester block copolymer (Pelprene S2000, tradename, manufactured by TOYOBO Co., Ltd.) were blended in the proportions as identified in Table 8 and treated in the same manner as in Example 6 to obtain compositions. These compositions were injection-molded to obtain test pieces, which were then subjected to an accelerated exposure test of 1,000 hours at 83° C. by a sunshine weatherometer. The yellowness index ΔYI after the exposure test and the color difference and the Izod impact strength after the heat aging at 120° C. for 600 hours are shown in Table 8. The composition of the present invention had weather resistance and heat resistance which can not be obtained by the conventional butadiene type graft copolymer, and it has a good surface appearance.

The thermoplastic resin composition of the present invention is excellent in the weather resistance, heat stability and low-temperature impact resistance by virtue of the above-mentioned construction, and it has a good surface appearance and colorability with a dyestuff or pigment. Thus, the thermoplastic resin composition of the present invention exhibits excellent effects.

We claim:

1. A polycarbonate resin composition comprising a polycarbonate resin (A) or a mixture (A′) of a polycarbonate resin with a saturated polyester resin and/or a polyester elastomer, and a compound rubber type graft copolymer (B) having at least one vinyl monomer graft-polymerized onto a compound rubber composed of from 10 to 90% by weight of a polyorganosiloxane rubber and from 10 to 90% by weight of a polyalkyl (meth)acrylate rubber in a total amount of 100% by weight in an inseparable interlocking fashion and having an average particle size of from 0.08 to 0.6 μm, or a mixture (B′) of such a compound rubber type graft copolymer (B) with a vinyl polymer, wherein component (B) or (B′) is in an amount such that the compound rubber is from 0.5 to 60% by weight based on the entire resin composition.

2. The composition according to claim 1, which comprises from 10 to 90% by weight of component (A) and from 10 to 90% by weight of component (B) or (B').

3. The composition according to claim 1, which comprises component (A') and component (B) or (B'), wherein component (A') is a mixture comprising from 1 to 99 parts by weight of a polycarbonate resin and from 1 to 99 parts by weight of a saturated polyester resin and/or a polyester elastomer.

4. The composition according to claim 1, wherein the compound rubber in component (B) is composed of a polyorganosiloxane rubber obtained by emulsion polymerization using an organosiloxane, a crosslinking agent and optionally a grafting agent, and a polyalkyl (meth)acrylate rubber obtained by having such a polyorganosiloxane rubber impregnated with an alkyl (meth)acrylate, a crosslinking agent and a grafting agent, followed by polymerization.

5. The composition according to claim 1, wherein the backbone of the polyorganosiloxane rubber has repeating units of dimethylsiloxane, and the backbone of the polyalkyl (meth)acrylate rubber has repeating units of n-butyl acrylate.

6. The composition according to claim 1, wherein the gel content of the compound rubber measured by extraction with toluene is at least 80% by weight.

7. The composition according to claim 1, wherein the vinyl polymer in component (B') is a vinyl polymer obtained by polymerizing from 70 to 100% by weight of at least one monomer selected from the group consisting of an aromatic vinyl monomer, a vinyl cyanide monomer, a methacrylate monomer and an acrylate monomer and from 0 to 30% by weight of a vinyl monomer copolymerizable therewith.

8. The composition according to claim 1, wherein the polycarbonate resin (A) is a bisphenol A type polycarbonate resin.

9. The composition according to claim 1, wherein in the mixture (A') of a polycarbonate resin with a saturated polyester resin and/or a polyester elastomer, the polycarbonate resin is a bisphenol A type polycarbonate, the saturated polyester is polytetramethylene terephthalate and/or polyethylene terephthalate, and the polyester elastomer is a block copolymer of a polytetramethylene terephthalate or a polyethylene terephthalate with a polyalkylene ether glycol or an aliphatic polyester having a molecular weight of from 400 to 20,000.

* * * * *